(12) United States Patent
Weng et al.

(10) Patent No.: US 11,125,625 B2
(45) Date of Patent: Sep. 21, 2021

(54) MICROBOLOMETER READOUT CIRCUIT AND CALIBRATION METHOD USING THE SAME

(71) Applicant: National Chung-Shan Institute of Science and Technology, Taoyuan (TW)

(72) Inventors: Ping-Kuo Weng, Kinmen County (TW); Yin-Yi Wu, Changhua County (TW); Shiang-Feng Tang, Taoyuan (TW); Wen-Jen Lin, Taoyuan (TW); Yau-Tang Gau, Taipei (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 444 days.

(21) Appl. No.: 16/231,923

(22) Filed: Dec. 24, 2018

(65) Prior Publication Data
US 2020/0200609 A1    Jun. 25, 2020

(51) Int. Cl.
G01J 5/24       (2006.01)
H04N 5/33       (2006.01)
G01J 5/20       (2006.01)
G01J 5/00       (2006.01)

(52) U.S. Cl.
CPC .................. G01J 5/24 (2013.01); H04N 5/33 (2013.01); *G01J 2005/0048* (2013.01); *G01J 2005/202* (2013.01)

(58) Field of Classification Search
CPC .................. G01J 5/24; G01J 2005/202; G01J 2005/0048; H04N 5/33; H04N 5/3651
See application file for complete search history.

(56) References Cited

U.S. PATENT DOCUMENTS

2002/0022938 A1*  2/2002  Butler ................. H04N 5/3655
                                                    702/85
2003/0213910 A1* 11/2003  Anderson ............ H04N 5/3651
                                                    250/338.1

* cited by examiner

*Primary Examiner* — David P Porta
*Assistant Examiner* — Meenakshi S Sahu
(74) *Attorney, Agent, or Firm* — Winston Hsu

(57) ABSTRACT

A microbolometer read-out circuit includes an extraction circuit configured to detect a voltage signal of a temperature variation; an analog-to-digital converter coupled to the extraction circuit and configured to digitalize the voltage signal of the temperature variation; an image processing circuit coupled to the analog-to-digital converter; and wherein the image processing circuit is coupled to a gain digital-to-analog converter and an offset digital-to-analog converter.

9 Claims, 10 Drawing Sheets

MICROBOLOMETER READOUT CIRCUIT AND CALIBRATION METHOD USING THE SAME

BACKGROUND OF THE INVENTION

1. Field of the Invention

The present disclosure relates to a readout circuit, and more particularly, to a microbolometer readout circuit and calibration method using the same.

2. Description of the Prior Art

Microbolometer is an element for measuring infrared radiation or other elements with radiation energy, which is developed by American Physicist Samuel Pierpont Langley in the early stage. A cooling device is necessary to the conventional microbolometer, which is costly, heavy and bulky in volume. Since 1990's, researches about array infrared microbolometer are increased. With the commencement of modern photolithography and micro electromechanical system (MEMS), the focal plane array with readout circuit is mass manufactured with rapid development of the room-temperature microbolometer. Since MEMS is compatible with conventional silicon semiconductor process, non-cooling microbolometer may be integrated with complementary metal-oxide-semiconductor (CMOS) element, and sizes and dimensions of the microbolometers manufactured by the MEMS process are identical to charge-coupled device (CCD) and CMOS. The conventional non-cooling microbolometer is mainly utilized on military night vision. However, with the improvement of efficiency and the decrease of cost of the microbolometer, the microbolometer is utilized on medical thermal image, environmental pollution supervision, climate changes, energy saving and carbon reduction, night vision, fire disaster and rescue, prediction of long-term agricultural crops and processing supervision of chemical characteristics.

An operation principle of the microbolometer is variation of resistance, when materials of the microbolometer absorb the infrared radiation, temperature of the material goes up, which generates the variation of the resistance. If the resistance of the material decreases with the increment of the temperature, the microbolometer is called a negative temperature coefficient microbolometer; in contrast, if the resistance of the material increases with the increment of the temperature, the microbolometer is called a positive temperature coefficient microbolometer. An intensity of the infrared emitted by an object may be detected by measuring the variation of resistance of the microbolometer. Since the temperature variation of the material generated by absorbing the infrared radiation is small, the microbolometer is necessarily to be thermal isolated, which avoids that the small temperature variation of the material is affected by surrounding elements or a substrate and cannot be detected.

The infrared microbolometer array is utilized for detecting the infrared radiation of a focal plane and generates a two-dimensional infrared image. Each microbolometer in the array is a pixel, and the resistance variation of each pixel represents the received radiation intensity. A circuit measuring the resistance variation of the pixel is the readout integrated circuit (ROIC). The ROIC utilizes time-multiplexing to read the resistance of each pixels in the array and transmit the resistance of each pixels to an image digital signal processor (DSP) for imaging, wherein the ROIC is generally fabricated in CMOS silicon substrate. The infrared microbolometer array use the CMOS ROIC as the substrate and manufactures floating element above with the MEMS technique, the microbolometer material, e.g. VOx, is sputter deposited/coated above the floating element and is thermal isolated with external environment by cooperating with vacuum encapsulation; therefore, the ROIC integrates with the infrared microbolometer array is called the focal plane infrared microbolometer. However, due to the manufacturing process, conductivity and temperature characteristics of each microbolometer array are not identical. When a uniform infrared radiation arrives the microbolometer array, the reactions of each microbolometer array are not the same, and such space non-uniformity will be larger than the intensity of the infrared radiation absorbed by the microbolometer, which needs the image DSP to calibrate and generate a uniform infrared image.

Please refer to FIG. 1, which is a schematic diagram of a conventional two-point calibration method. The ROIC may be simplified as a voltage source or a current source. Generally, the voltage or the current is applied to each microbolometer of the array, and current variation or voltage variation is thereby detected, and transformed to voltage signals, which are output to an image capturing system. The image capturing system executes the space non-uniformity calibration for the output of the ROIC, where the output value of the ROIC of each of the microbolometer of the array is given a unique gain and offset. The gain calibration is to multiply a specific gain coefficient to the output voltage from the ROIC, and the offset calibration is to add a specific offset coefficient to the output voltage from the ROIC. The two-point calibration method may be implemented by the image processing on the image capturing system or implemented on the ROIC with analogous technique.

Please refer to FIG. 2, which is a schematic diagram of the infrared image before calibration. When the infrared radiation of blackbody with a uniform temperature arrives the microbolometer array, the response, which are shown in left of FIG. 2, of each of the microbolometers are not identical and thereby generate the space non-uniformity. The histogram of the infrared image is shown in right of FIG. 2, where an output response is not the same, since the conductivity and temperature characteristics of each array microbolometer are not identical. Please refer to FIG. 3, which is a schematic diagram of the infrared image after calibration. The two-point calibration is an effective way to eliminate the space non-uniformity of infrared image, which needs two reference values to calibrate each pixel of the microbolometer array, wherein one of the reference values is to radiate a uniform temperature T1 of a scene radiation to the microbolometer, and the other one is to radiate another uniform temperature T2 of the scene radiation to the microbolometer. The two temperatures of the scene radiation are called calibration points, the actual temperatures of the scene radiation are not necessarily to be known, but should be extremely uniform, which not only eliminates the response of the space non-uniformity of the array the microbolometer, but also eliminates shield effect (e.g. around cosine-to-the-fourth). The output responses of each pixel of the array microbolometer after calibration are almost consistent.

Please refer to FIG. 4, which is a schematic diagram of a relationship between the scene temperature and post-correction non-uniformity (PCNU). However, some pixels of the microbolometer array after the two-point calibration are not as uniform as other pixels, which results in non-uniformity of the image, and called PCNU or residual non-uniformity. The definition of PCNU is a ratio of the image σ and the mean under a specific scene temperature after the two-point calibration, and the formula thereof is:

$$PCNU = \frac{\sigma}{\text{mean}}$$

If the drift of time and scene temperature are neglected, the infrared images generated by the microbolometer array at the scene temperatures after two points are theoretically perfect, i.e. PCNU is zero. In fact, if a relationship between the scene temperature and the PCNU under different scene temperatures are calculated and plotted, the PCNU is extremely large outside a range of the scene temperature, and usually, the largest allowable PCNU is within the two calibration points.

Please refer to FIG. 5, which is schematic diagram of an image histogram under the uniform scene temperature. The two-point calibration effectively calibrates the space non-uniformity to generate uniform images, which are visible to the human. Since the array of the room-temperature microbolometer is sensitive to the temperature of the substrate, the two-point calibration is only effective to the substrate with a fixed temperature, when a temperature variation of the substrate of the microbolometer array exceeds 0.01 Kelvin, the PCNU rapidly increases, and under a uniform scene temperature, the image histogram disperses. Therefore, a thermal-electric cooler is needed to the conventional room-temperature array microbolometer to stabilize the substrate temperature, such that a principle of stable offset of temperature is less than 0.01 Kelvin.

Please refer to FIG. 6, which is a schematic diagram of a structure of the ROIC proposed by Indigo Systems Corporation. In light of the image non-uniformity of the array of the room-temperature microbolometer caused by a temperature offset of the substrate, the Indigo Systems Corporation proposes a microbolometer ROIC structure and related method of eliminating the effect caused by the substrate temperature. The Indigo Systems Corporation adds different calibrating bias voltages on each microbolometer of the ROIC to solve the above mentioned problem, wherein each of the calibrating bias voltages are calculated and determined by measuring the microbolometer under different substrate temperatures and different infrared radiation intensities. Each thermally isolation bolometer of the ROIC structure provided by the Indigo Systems Corporation is connected to a p-channel MOSFET (MP), wherein the MP is a common gate amplifier and DAC1 (digital to analog converter) may be set externally to add different bias voltages on the gate of the MP and a drain current of the MP is integrated by a trans-impedance amplifier and an output voltage Vout is generated.

In addition, a DAC2 may adjust a loading current and the source of an n-channel transistor MN is connected to a thermally short bolometer. Since the thermally short bolometer is closely attached to the substrate of the ROIC without floating structure, the thermally short bolometer won't be affected by the infrared radiation and is varied by the changes of substrate temperature, thus, the drain current of MN may be utilized for adjusting the current of thermally isolation bolometer, such that the current variation, which is only generated by the infrared radiation, is integrated by the trans-impedance amplifier. Take a bolometer FPA of the Indigo Systems Corporation with a size of 160×128 for example, 18 DACs and 9 current-to-voltage converters in total are needed in the ROIC.

As for a selection method of calibration coefficient (i.e. setting values of DACs) of the substrate temperature of each of the microbolometers array, the Indigo Systems Corporation adopts a linear increasing method to respectively take 4 different infrared images under each of the DAC setting values, wherein two infrared images are recorded at substrate temperature Tmin with two different scene temperatures Qmin and Qmax, and two infrared images are recorded at substrate temperature Tmax with two different scene temperatures Qmin and Qmax. Assume that the DAC is 14 bits, then $2^{14} \times 4$ images are stored, which are all stored in memory, and then the image DSP calculates optical gains corresponding to each of microbolometers under different DAC setting values and different substrate temperatures according to the stored images. A formula of optical gain is:

$$G = \frac{V_{Q\max} - V_{Q\min}}{Q\max - Q\min}$$

wherein VQmax and VQmin respectively denote a FPA output at radiation scene temperatures Qmax and Qmin. If the DAC value of individual microbolometer satisfies the following formulas:

$$\frac{G1(T\max)}{Gm(T\max)} = \frac{G1(T\min)}{Gm(T\min)}$$

$$\frac{G2(T\max)}{Gm(T\max)} = \frac{G2(T\min)}{Gm(T\min)}$$

$$\vdots$$

$$\frac{Gn(T\max)}{Gm(T\max)} = \frac{Gn(T\min)}{Gm(T\min)}$$

the DAC value is the required setting value, wherein G1 (Tmax) . . . Gn (Tmax) and G1 (Tmax) . . . Gn (Tmin) are optical gains of each microbolometer at the substrate temperatures Tmax and Tmin, Gm(Tmax) and Gm(Tmin) are average optical gains at the substrate temperatures Tmax and Tmin.

Please refer to FIG. 7, which is a schematic diagram of a relationship between the FPA output, substrate temperature, and the temperature of a radiation field scene before calibration. After the substrate temperature of each of microbolometer is calibrated with different DAC coefficients (bias voltages), the image is then applied with the conventional two-point calibration method and the non-uniformity of pixels caused by the variation of the substrate temperature is eliminated. Please refer to FIG. 8, which is a schematic diagram of the PCNU with the substrate temperature and the scene temperature in the calibration process. The PCNU is significantly decreased in the calibration range of the substrate temperature and the scene temperature, wherein the variation of the substrate temperature within a range of 10 Kelvin is effective to compensate the non-uniformity of the microbolometer.

In summary, the conventional ROIC circuit of Indigo Systems Corporation applies different bias voltages on each pixel to effectively calibrate non-uniformity of the microbolometer, which is caused by the variation of the substrate temperature, but some disadvantages are found. One of the disadvantages is that more circuits are required to the ROIC, e.g. 18 DACs and 9 trans-impedance amplifier are required to the bolometer ROIC stated above with the size 160×128, the more transistors are adopted in the ROIC, the more power consumption is required when in operation, which enlarges the variation range of the substrate temperature and affects the effect of the calibration. The second disadvantage is that the data amount processed by the image DSP is too massive. When the DAC is 14 bits, the image DSP is required to store $2^{14} \times 4$ images in total to select the DAC values for the microbolometer, a selection process of image data is time-consuming, and the calibration process is too complicated. The third disadvantage is that, in order to obtain different substrate temperatures for the calibration, heaters and temperature control circuits are needed to the ROIC, which increases the complexity of FPA.

SUMMARY OF THE INVENTION

In light of the disadvantages of the prior art stated above, the present disclosure proposes the microbolometer ROIC to calibrate the non-uniformity cause by the variation of the substrate temperature by the external control circuit.

To achieve the goals stated above, the present disclosure accordingly provides a microbolometer read-out circuit comprises an extraction circuit, configured to detect a voltage signal of a temperature variation; an analog-to-digital converter, coupled to the extraction circuit and configured to digitalize the voltage signal of the temperature variation; and an image processing circuit, coupled to the analog-to-digital converter; and wherein the image processing circuit is coupled to a gain digital-to-analog converter and an offset digital-to-analog converter.

Preferably, the extraction circuit comprises an active pixel circuit, configured to detect an infrared radiation; a reference pixel circuit, configured to compensate a substrate temperature; a differential amplifier, coupled to the active pixel circuit and the reference pixel circuit; and an amplifier, coupled to the differential amplifier.

Preferably, the active pixel circuit comprises a plurality of active pixels, wherein each of the plurality of active pixels comprises an active current source, a thermally isolation microbolometer, an active AND gate, a first active current source switch and a second active signal output switch.

Preferably, the reference pixel circuit comprises a plurality of reference pixels, wherein each of the plurality of reference pixels comprises a reference current source, a thermally short microbolometer, a reference AND gate, a first reference current source switch and a second reference signal output switch.

Preferably, the plurality of active pixels are thermally isolated by a plurality of elevated floats.

Preferably, the plurality of active pixels further comprises a resistor and a third switch, a first end of the resistor is coupled to a first end of the thermally isolation microbolometer, a second end of the resistor is coupled to a first end of the third switch, and a second end of the third switch is couple to a second end of the thermally isolation microbolometer.

Preferably, the image processing circuit comprises a gain calculation unit, a compensation calculation unit and an image output unit.

A calibration method for a microbolometer, which detects a temperature of the microbolometer and calibrates an error of the microbolometer, wherein the method utilizes the microbolometer read-out circuit of claim 1, and the method comprises (A) heating a substrate of the microbolometer read-out circuit, such that the substrate reaches a first substrate temperature, and a scene temperature of the microbolometer read-out circuit is set as a first scene temperature; (B) performing an image detection for the microbolometer read-out circuit to obtain a first image data of the microbolometer read-out circuit; (C) cooling the substrate of the microbolometer read-out circuit to obtain a second substrate temperature and a second scene temperature; (D) performing the image detection for the microbolometer read-out circuit to obtain a second image data of the microbolometer read-out circuit; (E) comparing the first image data and the second image data to obtain a temperature compensation value; and (F) performing step(c) to step (E) to obtain the temperature compensation value corresponding to the cooling and transmitting the temperature compensation value to a digital-to-analog converter for transforming a voltage signal, which is utilized for adjusting the substrate temperature for compensation.

Preferably, the step (E) further comprises comparing the first image data and the second image data by the image processing circuit.

Preferably, the substrate is heated by utilizing power consumptions of a resistor and the microbolometer.

Therefore, the present disclosure utilizes the external circuit to calibrate the variation of the substrate temperature caused by the non-uniformity. The circuit structure is simple and the power consumption is low when in operation, which further reduces the variation of the substrate temperature caused by dynamic operations of the circuit. In addition, in cooperation with the structure of the ROIC, the present disclosure provides the calibration method for the microbolometer, which only needs a small amount of memory to calculate the bias values for calibration of non-uniformity of the substrate temperature.

These and other objectives of the present invention will no doubt become obvious to those of ordinary skill in the art after reading the following detailed description of the preferred embodiment that is illustrated in the various figures and drawings.

DETAILED DESCRIPTION

The following description is embodiments of the present disclosure according to specific examples, and those skilled in the art may easily understand other advantages and effects of the present disclosure from the specification.

Figure 1:
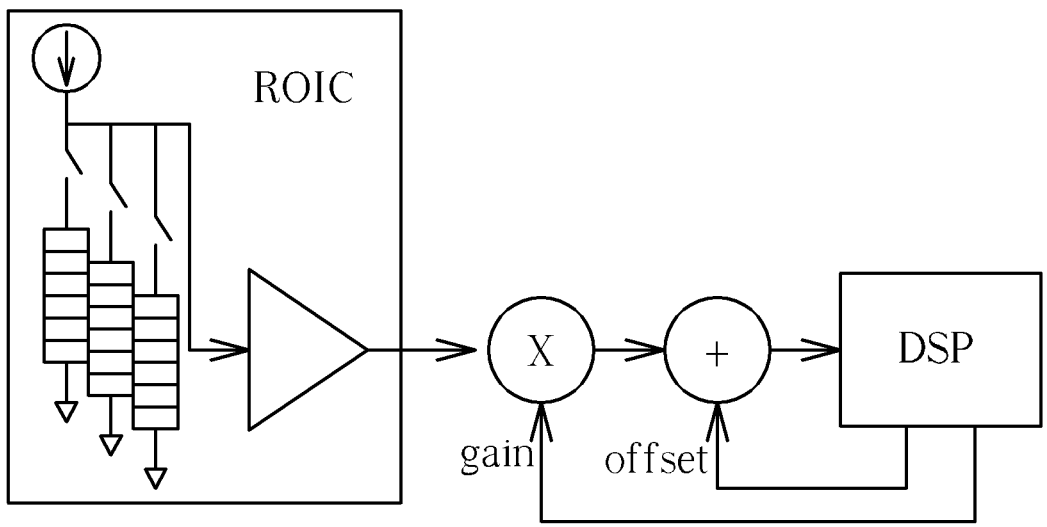
FIG. 1 is a schematic diagram of a conventional two-point calibration method.
Figure 2:
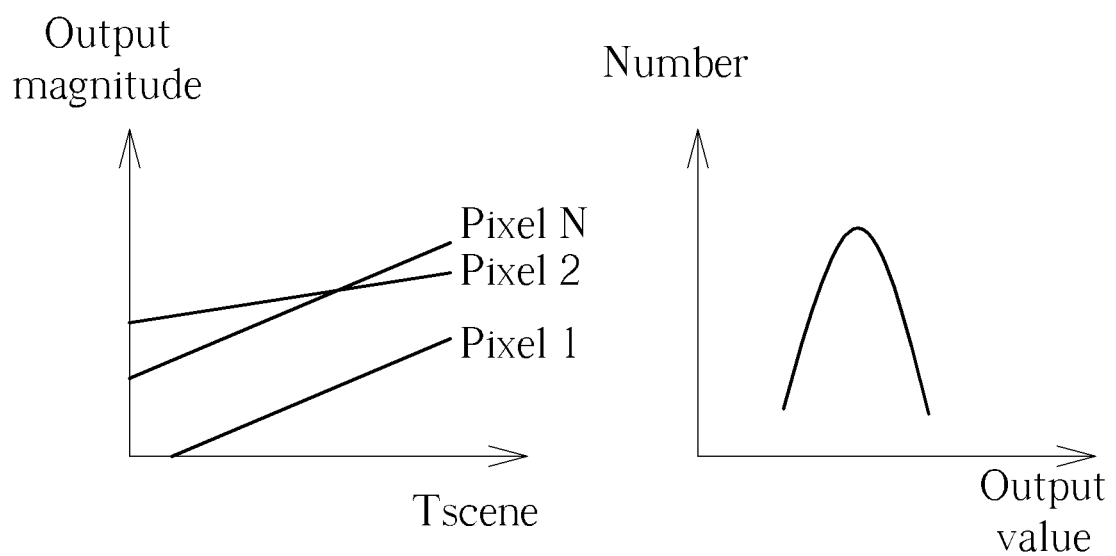
FIG. 2 is a schematic diagram of an infrared image before the calibration.
Figure 3:
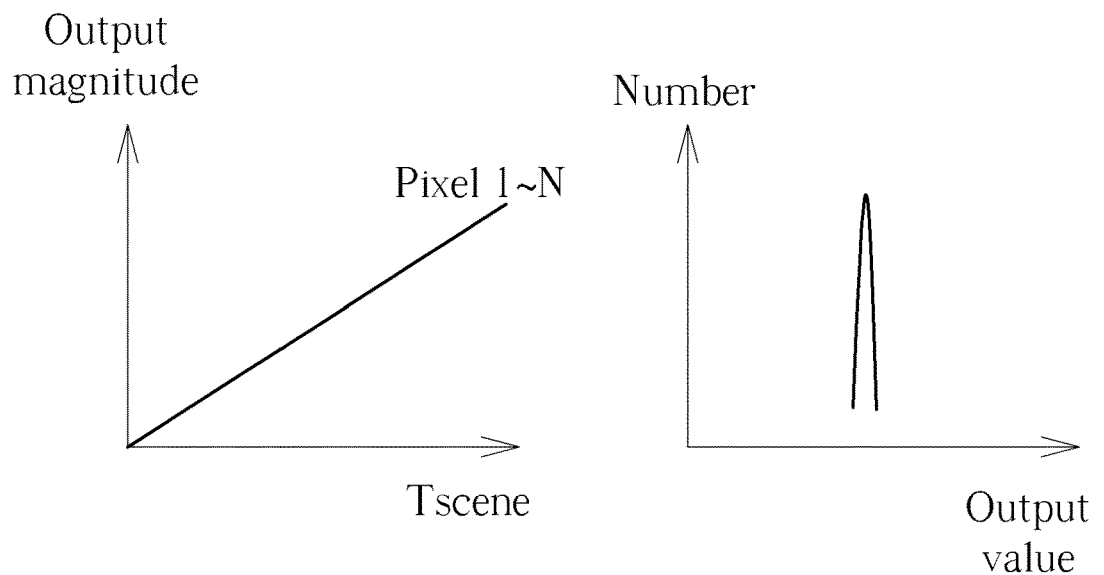
FIG. 3 is a schematic diagram of the infrared image after the calibration.
Figure 4:
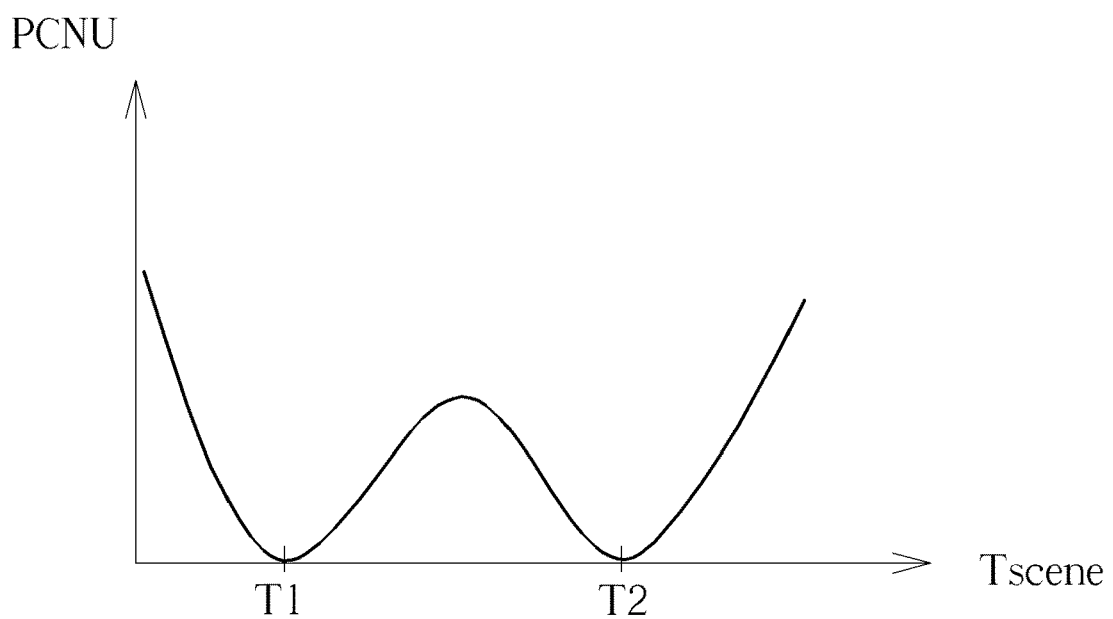
FIG. 4 is a schematic diagram of a relationship between a scene temperature and post-correction non-uniformity (PCNU).
Figure 5:
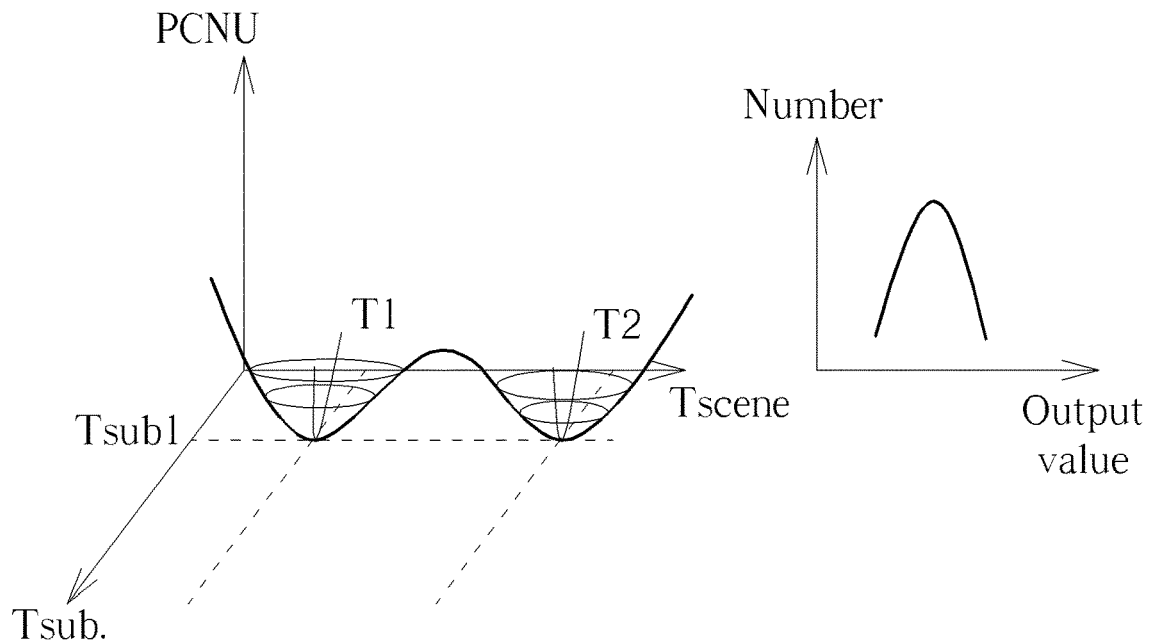
FIG. 5 is schematic diagram of an image histogram under the uniform scene temperature.
Figure 6:
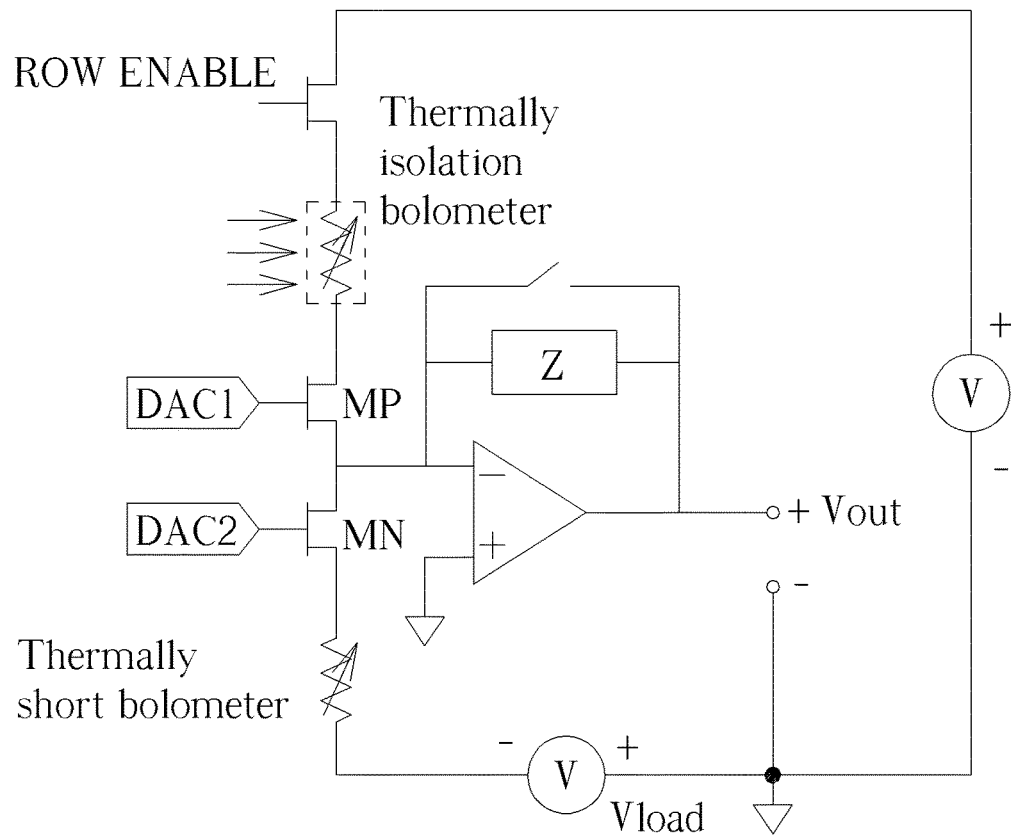
FIG. 6 is a schematic diagram of a structure of a read out integrated circuit (ROIC) proposed by Indigo Systems Corporation.
Figure 7:
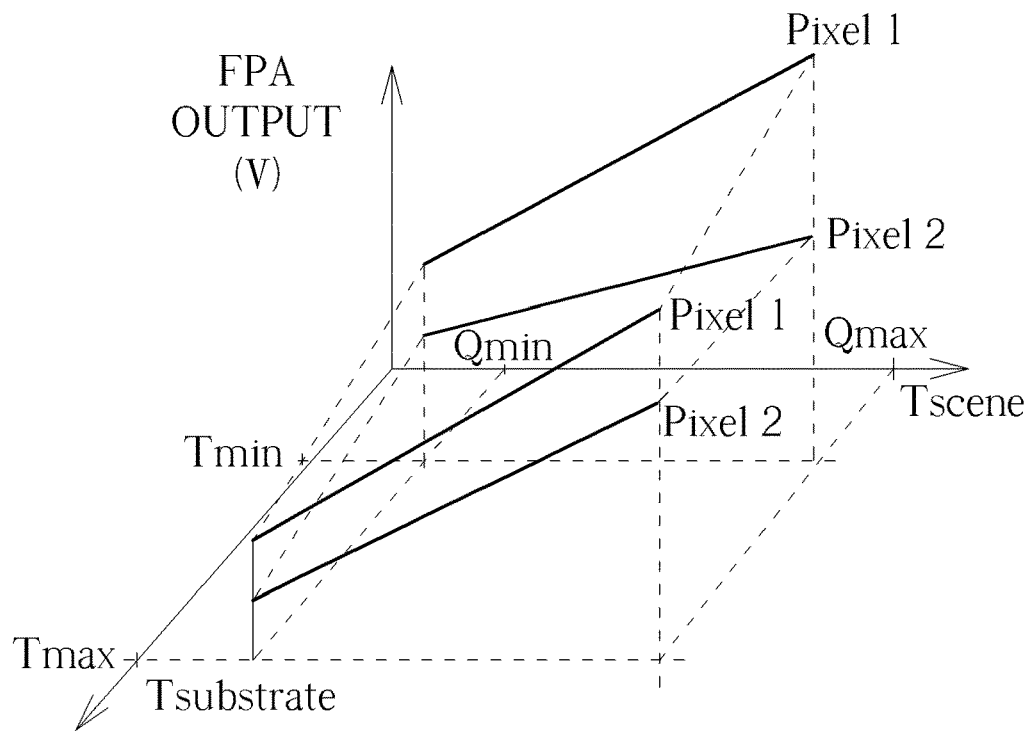
FIG. 7 is a schematic diagram of a relationship between an FPA output, substrate temperature and temperature of radiation field scene before calibration.
Figure 7:
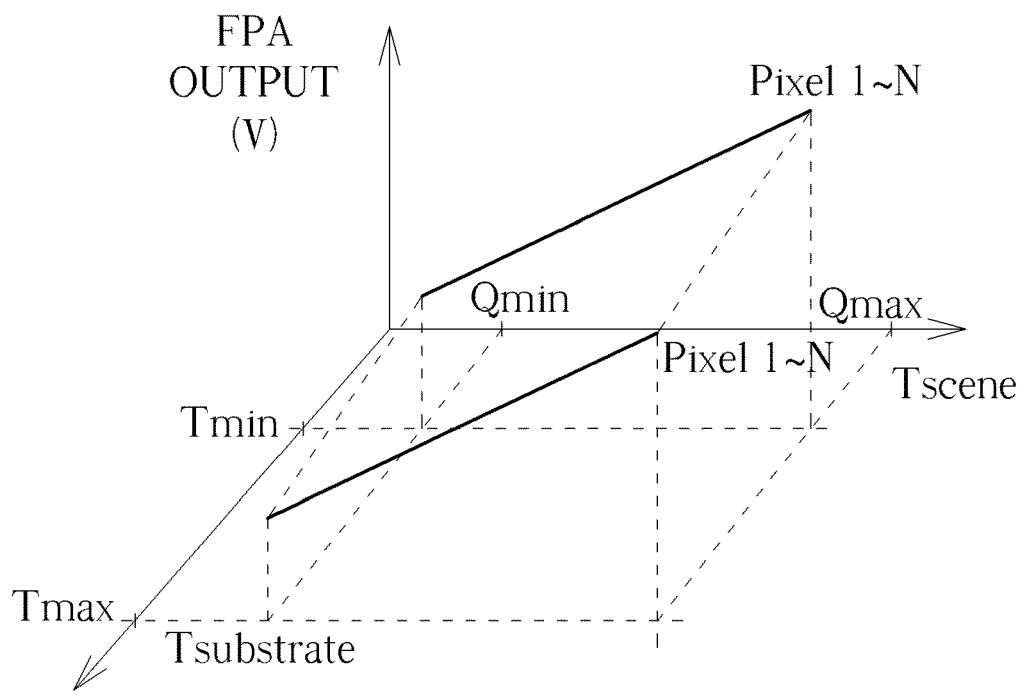
Figure 8:
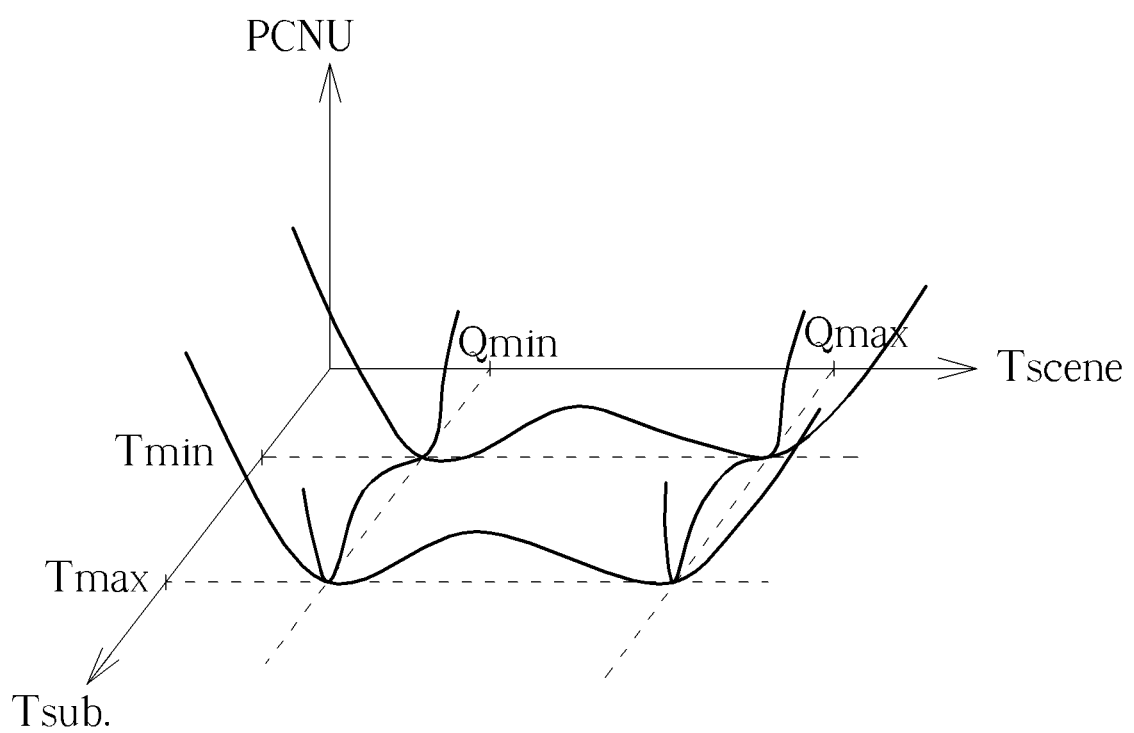
FIG. 8 is a schematic diagram of the PCNU with the substrate temperature and the scene temperature in the calibration process.
Figure 9:
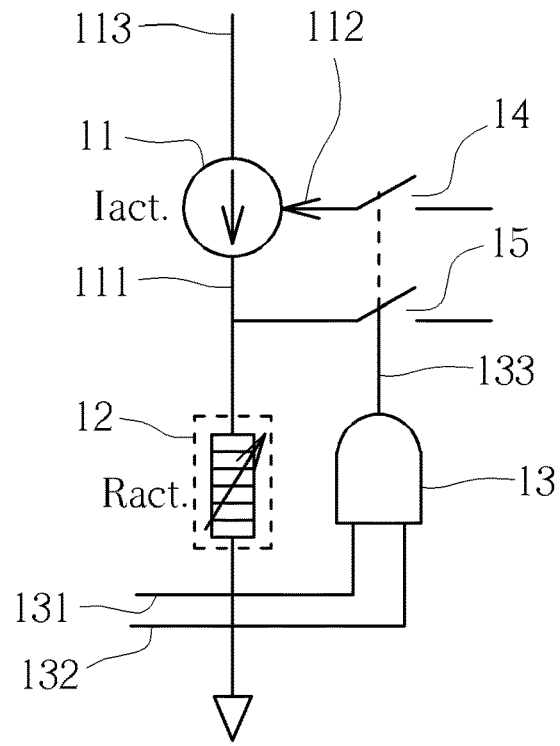
FIG. 9 is a schematic diagram of an active pixel according to an embodiment of the present disclosure.

Please refer to FIG. 9, which is a schematic diagram of an active pixel according to an embodiment of the present disclosure. The active pixel includes an active current source 11, a thermally isolation microbolometer 12, and an active AND gate 13, a first active current source switch 14 and a second active signal output switch 15. A first active end 111 of the active current source 11 is connected to an end of the thermally isolation microbolometer 12 and an end of the second active signal output switch 15. The first active current source switch 14 is connected to an active end 112 of the active current source 11, and a third active end 113 of the active current source 11 is connected to a power. In addition, a first active AND gate 131 and a second active AND gate 132 of the active AND gate 13 are respectively connected to a horizontal multiplexer and a vertical multiplexer. A third active AND gate 133 of the active AND gate 13 is connected to the first active current source switch 14 and the second active signal output switch 15, and another end of the thermally isolation microbolometer 12 is connected to a ground. The thermally isolation microbolometer 12 is configured to detect the infrared radiation, and the active AND gate 13 is configured to control the first active current source switch 14 and the second active signal output switch 15. When an output of the active AND gate 13 is High, and the first active current source switch 14 and the second active signal output switch 15 are simultaneously SHORT, the active current source 11 is activated and the output signal voltage is output.

Figure 10:
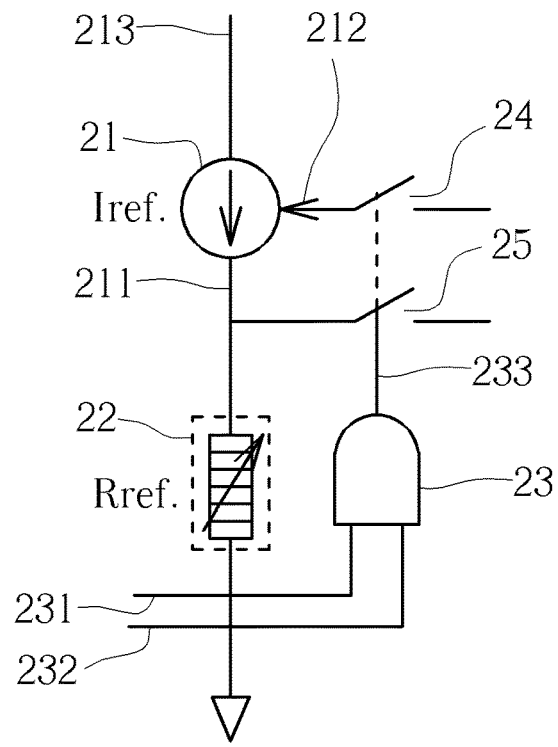
FIG. 10 is a schematic diagram of a reference pixel according to an embodiment of the present disclosure.

Then, please refer to FIG. 10, which is a schematic diagram of a reference pixel according to an embodiment of the present disclosure. The reference pixel includes a reference current source 21, a thermally short microbolometer 22, a reference AND gate 23, a first reference current source switch 24 and a second reference signal output switch 25, wherein a first reference end 211 of the reference current source 21 is connected to an end of the thermally short microbolometer 22 and an end of the second reference signal output switch 25. The first reference current source switch 24 is connected to a second reference end 212 of the reference current source 21, and a third reference end 213 of the reference current source 21 is connected to a power. In addition, a first reference AND gate 231 and a second reference AND gate 232 of the reference AND gate 23 are respectively connected to a horizontal multiplexer and a vertical multiplexer. A third active AND gate 233 of the reference AND gate 23 is connected to the first reference current source switch 24 and the second reference signal output switch 25, and another end of the thermally isolation microbolometer 22 is connected to a ground.

Figure 11:
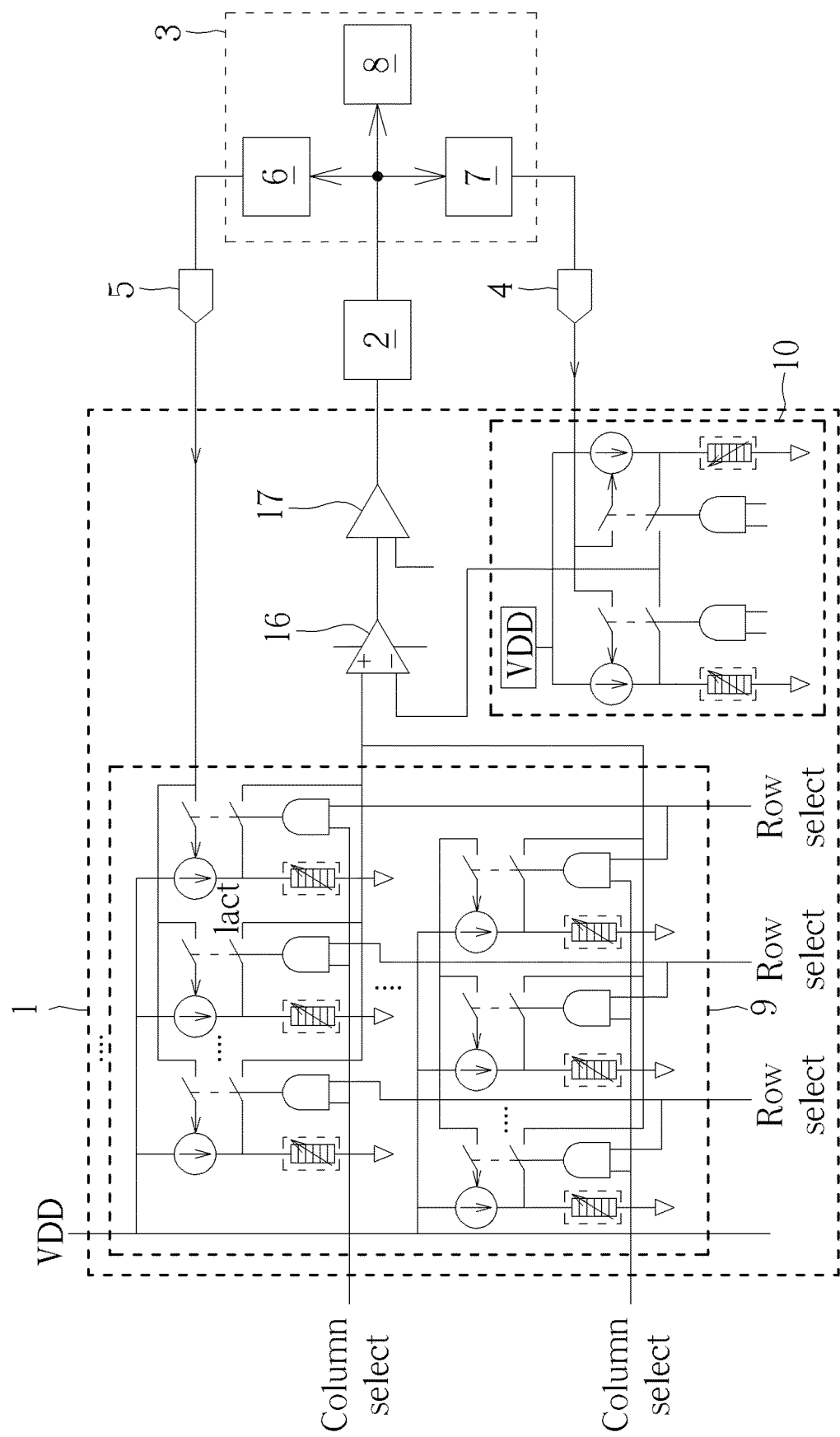
FIG. 11 is a schematic diagram of a microbolometer ROIC according to an embodiment of the present disclosure.

Please refer to FIG. 11, which is a schematic diagram of the microbolometer ROIC based on the active pixel and the reference pixel in FIGS. 9 and 10. The microbolometer ROIC includes an extraction circuit 1, an analog-to-digital converter 2, an image processing circuit 3, a gain digital-to-analog converter 4 and an offset digital-to-analog converter 5, wherein the extraction circuit 1 is configured to detect a voltage signal corresponding to a temperature variation, and an end of the analog-to-digital converter 2 is coupled to the extraction circuit 1 and is configured to digitalize the voltage signal corresponding to the temperature variation, another end of the analog-to-digital converter 2 is connected to the image processing circuit 3, and the image processing circuit 3 is connected to an end of the gain digital-to-analog converter 4 and an end of the offset digital-to-analog converter 5, wherein the image processing circuit 3 includes a gain calculation unit 6, a compensation calculation unit 7 and an image processing unit 8.

The extraction circuit 1 further includes an active pixel circuit 9, a reference pixel circuit 10, a differential amplifier 16 and an amplifier 17. The active pixel circuit 9 is configured to detect the infrared radiation, the reference pixel circuit 10 is configured to compensate the substrate temperature and the active pixel circuit 9, and the reference pixel circuit 10 is connected to the differential amplifier 16, which is connected to the amplifier 17, wherein the active pixel circuit 9 and the reference pixel circuit 10 respectively include a plurality of active pixels and a plurality of reference pixels, and the third active end 113 of the active current source 11 of each active pixel and the third reference end 213 of the reference current source 21 of each reference pixel are connected to the source. The second active signal output switch 15 and the second reference signal output switch 25 are respectively connected to the differential amplifier 16. The first active current source switch 14 and the first reference current source switch 24 are respectively connected to the gain digital-to-analog converter 4 and another end of the offset digital-to-analog converter 5. The first active AND gate 131 and the second active AND gate 132 of the active AND gate 13, the first reference AND gate 231 and the second reference AND gate 232 of the reference AND gate 23 are connected to the horizontal multiplexer and the vertical multiplexer.

In a preferable embodiment, when a pixel of the microbolometer ROIC is read, the peripheral horizontal multiplexer and vertical multiplexer of the microbolometer ROIC enable the active AND gate 13 and the reference AND gate 23 of the read-out active pixel and reference pixel, and then the output voltage signals are extracted by the differential amplifier 16. However, a resistance of the thermally short microbolometer 22 of the reference pixel remains the same when absorbing the scene temperature and a resistance of the thermally isolation microbolometer 12 of the active pixel changes with scene temperature; therefore, the output of the differential amplifier 16 is the voltage signal corresponding to the scene temperature variation, and the voltage signal is amplified and offset by the amplifier 17 and then transferred to the analog-to-digital converter 2. The digitalized image data is transferred to the image processing unit 3, which calculates the gain value and the compensation value for each pixel according to the conventional two-point calibration and transmits the gain value and the compensation value to the gain digital-to-analog converter 4 and the offset digital-to-analog converter 5 respectively. The analog voltage output of the gain digital-to-analog converter 4 and the offset digital-to-analog converter 5 are respectively utilized for adjusting the active current source 11 and the reference current source 21 of the active pixel and the reference pixel, so as to achieve the effect of the conventional two-point calibration, wherein each active pixel has its corresponding gain digital-to-analog value and offset digital-to-analog value. In another preferable embodiment, when the microbolometer ROIC is configured to compensate the substrate temperature, the image processing circuit 3 is required to calculate each gain value of each pixel and outputs the gain value to the gain digital-to-analog converter 4. The analog voltage output by the gain digital-to-analog converter 4 may adjust the active current source 11 of the active pixel, so as to compensate the substrate temperature, wherein each active pixel has its corresponding gain digital-to-analog value.

In a preferable embodiment, the active pixels in the thermally isolation microbolometer 12 are elevated by floats and incorporated with a vacuum encapsulation to achieve the thermal isolation with external environment. The reference pixels in the thermally short microbolometer 22 are free from the floats and are closely attached to the microbolometer ROIC, and the thermally short microbolometer 22 is not affected by external infrared radiation. The resistance of the thermally short microbolometer 22 of the reference pixel is only varied with the substrate temperature, and the thermally short microbolometer 22 may be configured to compensate the variation of the substrate temperature, which only works for 0.1 Kelvin of the substrate temperature. Moreover, the active pixel further includes a resistor and a third switch, an end of the resistor is connected an end of the thermally isolation microbolometer 12, and another end of the resistor is connected an end of the third switch. Another end of the third switch is connected to another end of the thermally isolation microbolometer 12, which may be utilized for simulating the thermally isolation microbolometer to filter the microbolometer ROIC with normal function. The third switch is utilized for switching the loading of the active current source 11 as the resistor or the microbolometer.

Figure 12:
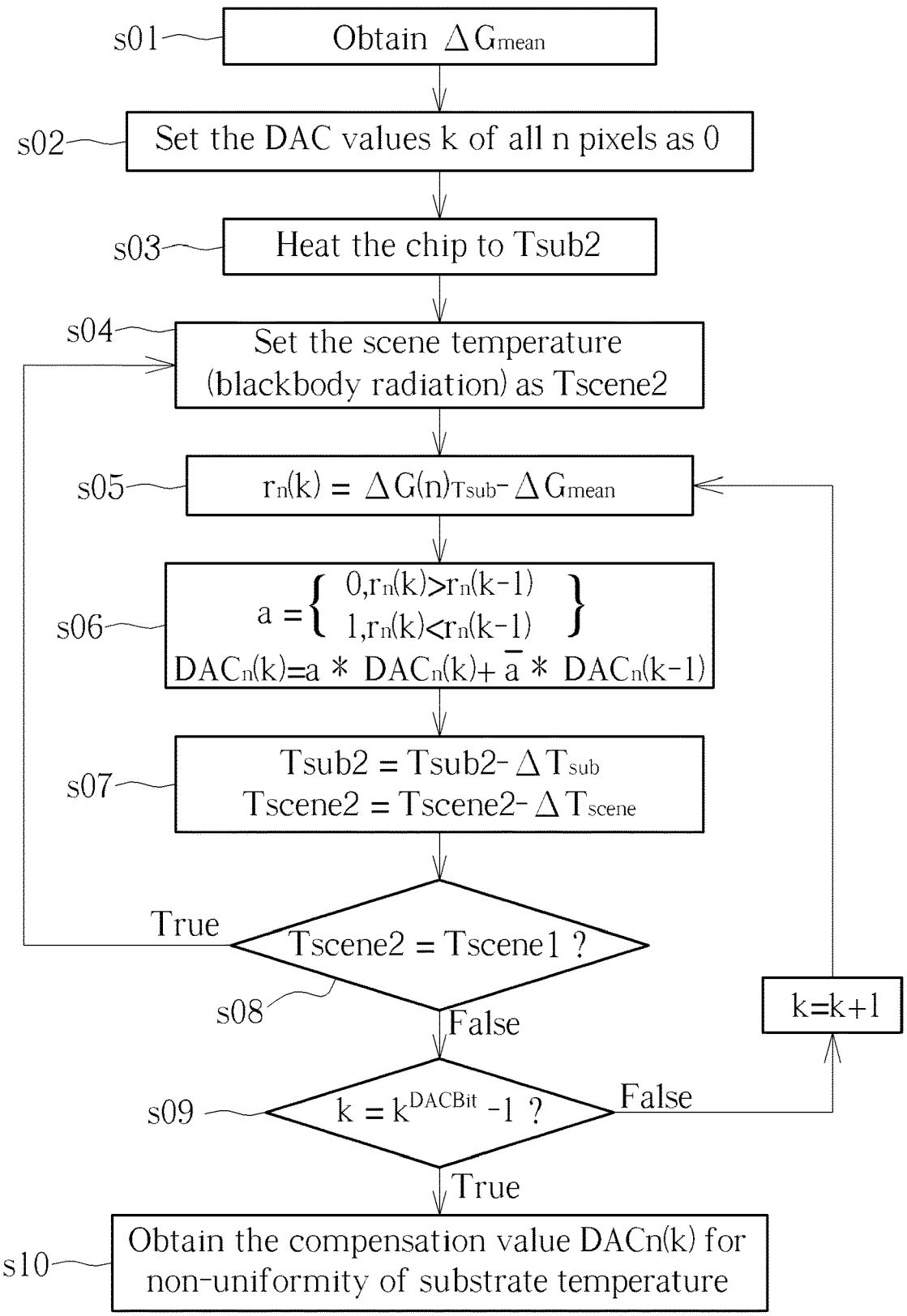
FIG. 12 is a schematic diagram of a process of the calibration method of the microbolometer according to an embodiment of the present disclosure.
Figure 13:
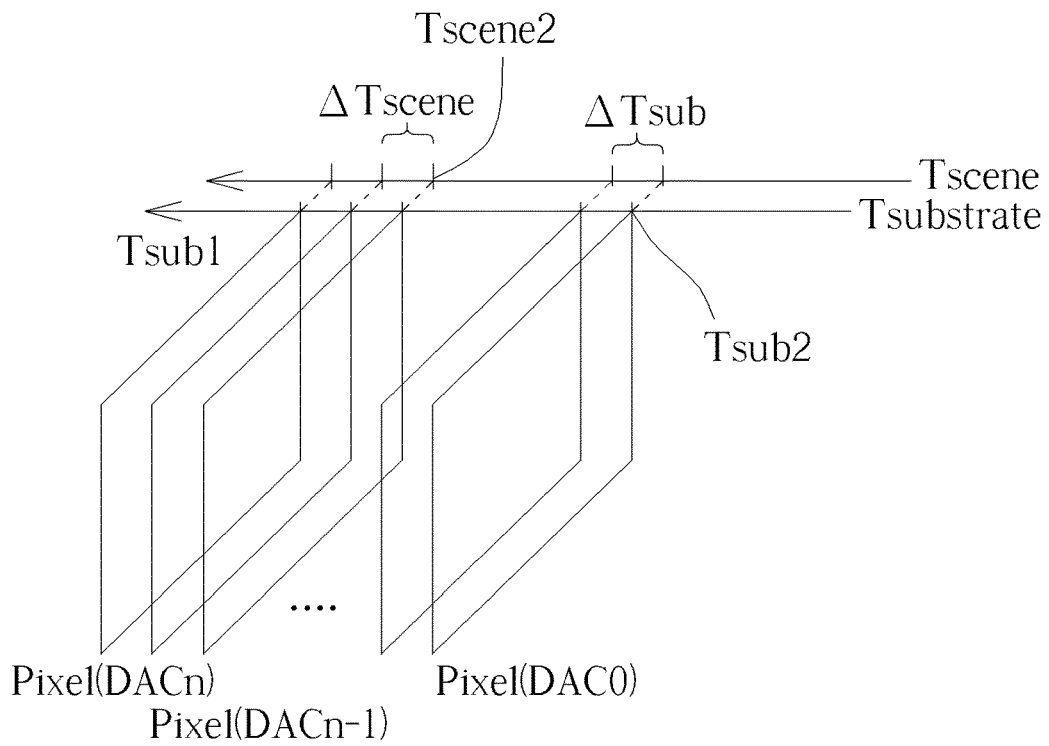
FIG. 13 is a schematic diagram of variations between the scene temperature and the substrate temperature according to an embodiment of the present disclosure.

Please refer to FIGS. 12 and 13, which are schematic diagrams of the microbolometer ROIC substrate compensation flow based on FIG. 11. FIG. 12 further explains a schematic diagram of a process of the calibration method of the microbolometer according to an embodiment of the present disclosure, and FIG. 13 further explains a schematic diagram of variations between the scene temperature and the substrate temperature according to an embodiment of the present disclosure. First, assume that an output signal intensity of the microbolometer ROIC is f(x,y), wherein x denotes the scene temperature Tscens, y denotes the substrate temperature Tsub, and a formula of the optical gain is:

$$\text{optical gain} = \frac{\partial f(x, y)}{\partial x}$$

And a variation rate $\Delta G_{Tsub}$ of the optical gain and the substrate temperature is:

$$\Delta G_{Tsub} = \frac{\partial}{\partial y}\left(\frac{\partial f(x, y)}{\partial x}\right) = \frac{\partial^2 f(x, y)}{\partial x \partial y}$$

Therefore, as long as a set of digital-to-analog (DAC) values are determined for each pixel, the $\Delta G\ (n)Tsub$ of the pixel satisfies the following formula:

$$\forall n \in N : \Delta G(n)_{Tsub} = \Delta G_{mean} = \frac{G_{mean}(Tsub2) - G_{mean}(Tsub1)}{T_{sub2} - T_{sub1}}$$

The optical gain of all pixels to the variations of the substrate temperature are identical, which achieves the non-uniformity calibration of the substrate temperature, wherein N denotes pixels of the array of microbolometer, $\Delta G_{mean}$ denotes a variation (slope) of Gm(Tsub1) and Gm(Tsub2) of average optical gain of all pixels to the substrate temperature when the ROIC is under the substrate temperatures Tsub1 and Tsub2.

FIGS. 12 and 13 illustrate the process of finding the substrate temperature calibration coefficient of the present disclosure for the microbolometer. First, in step s01, the $\Delta G_{mean}$ is obtained. In step s02, the DAC values k of all n pixels are set as 0. In step s03, heat the substrate of the microbolometer ROIC, such that the substrate achieves a first substrate temperature Tsub2. In step s04, set the scene temperature of the microbolometer ROIC as a first scene temperature Tscene2. Then in steps s05-s07, the microbolometer ROIC performs the image detection to obtain a first image data of the microbolometer ROIC, cool the substrate temperature of the microbolometer ROIC to obtain a second substrate temperature $\Delta$Tsub and set a second scene temperature Tscene2-$\Delta$Tscene. Then, the microbolometer ROIC performs the image detection once again to obtain a second image data of the microbolometer ROIC, and to acquire a temperature compensation value (DACn (k)) by comparing the first image data and the second image data.

Then in steps s08-s10, perform steps s05-s07 for the microbolometer ROIC to obtain the temperature compensation values for each cooling, and transmit the temperature compensation values to the digital-to-analog converter for generating a voltage signal accordingly, wherein the voltage signal is utilized for adjusting the substrate temperature for compensation.

Figure 14:
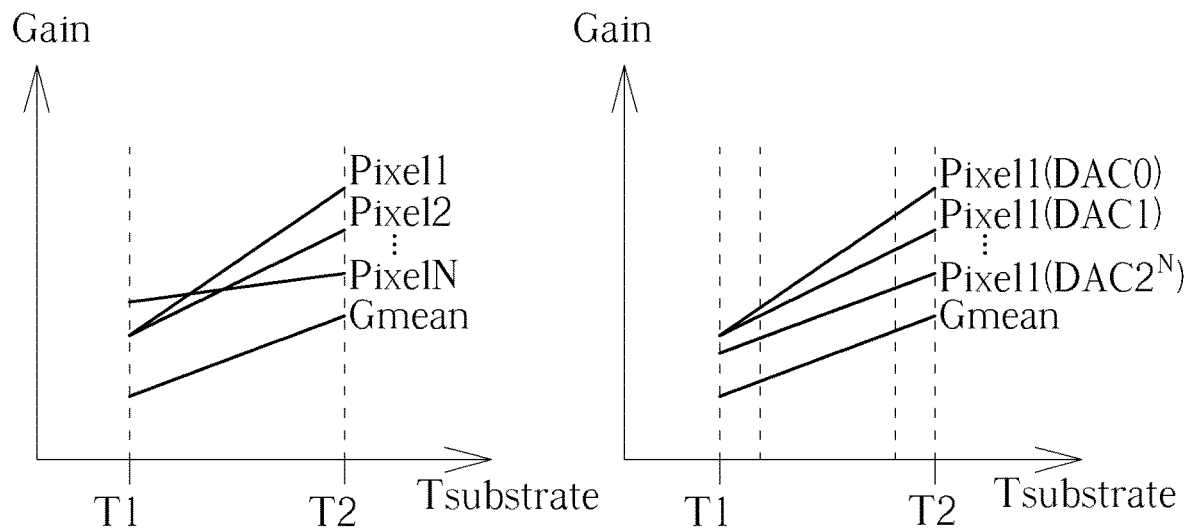
FIG. 14 is a schematic diagram of slopes of the optical gains of all pixels to the substrate temperature variation before calibration according to an embodiment of the present disclosure.

Please refer to FIG. 14, which is a schematic diagram of slopes of the optical gains of all pixels to the substrate temperature variation before calibration according to an embodiment of the present disclosure. As shown in left of FIG. 14, before the calibration for the substrate temperature, under different substrate temperatures, the optical gains of each of pixels are not identical. In addition, when the substrate temperature Tsubstrate changes, the optical gain of each pixel differs with slope of the variation of the substrate temperature. As shown in right of FIG. 14, take pixel 1 for example, when bias current of the same pixel is under different DAC values, the optical gains and the variation rates of the substrate temperature are not identical.

Figure 15:
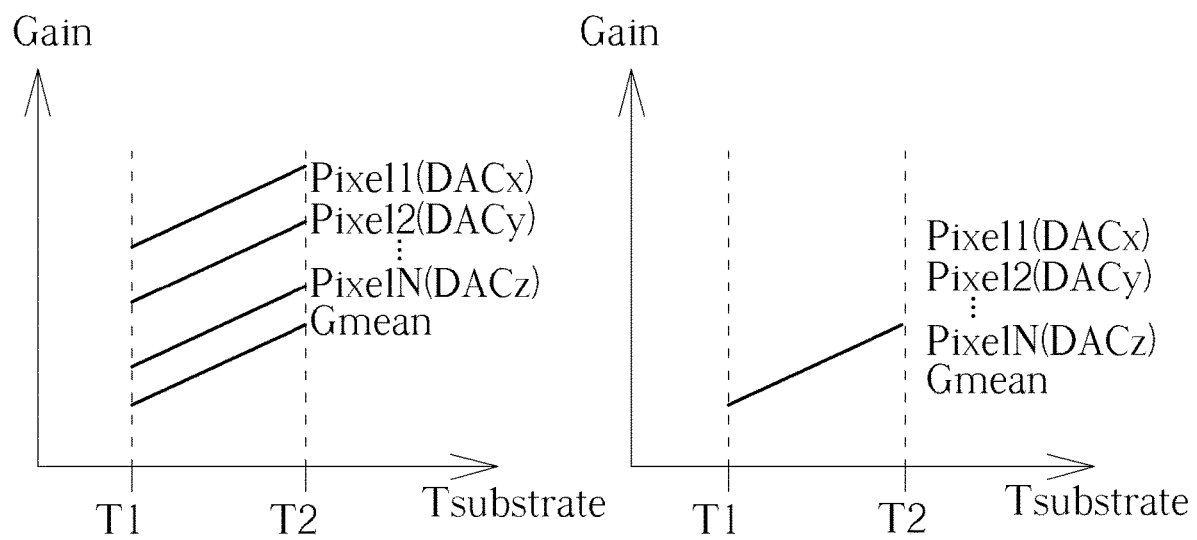
FIG. 15 is a schematic diagram of slopes of the optical gains of all pixels to the substrate temperature variation after calibration according to an embodiment of the present disclosure.

Please refer to FIG. 15, which is a schematic diagram of slopes of the optical gains of all pixels to the substrate temperature variation after calibration according to an embodiment of the present disclosure. The calibration method for the substrate temperature of the microbolometer of the present disclosure is to apply different currents on different microbolometers, so as to calibrate the non-uniformity caused by the substrate temperature. The calibration method is to apply different currents on different pixels, such that the variation of the optical gains of all pixels are almost identical to the variation rate of the average gain Gmean to the substrate temperature Tsubstrate when the substrate temperature changes. Since the substrate temperature changes, the slopes/variation rate of all pixels to the variation rate of the substrate temperature are identical, the non-uniformity caused by the variation of the substrate temperature may be effectively reduced and the conventional microbolometer ROIC is free from the cooler. Therefore, when all DAC values of all pixels are determined, as shown in FIG. 15, the slopes of the optical gains of all pixels to the variation of substrate temperature are almost identical to the average gain, which thereby eliminates the non-uniformity caused by the variation of the substrate temperature. When the substrate temperature is in the range of T1 and T2, the non-uniformity may be effectively reduced. Under the bias voltage, the image processing circuit performs the two-point calibration method, such that the slopes of the optical gains of all pixels to the substrate temperature are identical, and the non-uniformity caused by the variation of the substrate temperature is eliminated.

In another preferable embodiment, before calibrating the substrate temperature, the substrate of the microbolometer ROIC should be heated, so as to measure the optical gains at different temperatures. The present disclosure utilizes the resistor of each pixel of the microbolometer ROIC and the power consumption of the ROIC as a heating method, wherein the power consumption of resistor is $P_{Rtest}=I^2 \times Rtest$. Take the microbolometer ROIC of 160*120 of the present disclosure as an example, the current of the microbolometer ROIC is 200 uA, the resistor is serial connected to the thermally isolation microbolometer, and a resistor of the thermally isolation microbolometer is 50 K, where the power consumption of single resistor is 2 mW, and generally, a formula of the power consumption is:

$$P_{ROIC}=fCV_{DD}^2$$

wherein f denotes an operating frequency, C denotes an equivalent capacitance of the microbolometer ROIC, $V_{DD}$ denotes an operation voltage of the microbolometer ROIC. Take the microbolometer ROIC of 160*120 of the present disclosure as the example, when $V_{DD}$=5V and a main frequency is 4 MHz, the power consumption is about 0.4 W, and the equivalent capacitance is around 4 nF based on the power consumption.

The power consumption of the microbolometer ROIC and the resistor increase the temperature of the chip, and a formula of the increment of the chip temperature is:

$$Trise = \frac{(P_{ROIC}+P_{Rtest}) \times T}{ThermalMass}$$

wherein PROIC denotes the power consumption of the microbolometer ROIC, $P_{Rtest}$ denotes the power consumption of the resistors, T denotes the microbolometer ROIC, ThermalMass denotes a thermal unit value of the silicon chip. Assume that the ThermalMass is 0.712*103 J/Kg° C., a mass of the microbolometer ROIC is 10 g. Under a heating mode, a heating period is 100 Seconds, the operating frequency of the microbolometer ROIC is 32 MHz, then the increment of the temperature of the microbolometer ROIC is 45° C. Therefore, with the substrate temperature for calibrating the non-uniformity of the substrate temperature, the present disclosure increases the operating frequency and enlarges the power consumption of the resistors under the heating mode to the required temperature Tsub2 in a period of time, and switches the microbolometer ROIC to the normal mode, and determines the DAC values for calibrating the non-uniformity of the substrate temperature with the naturally cooling of the substrate and the decrease of the Tscene.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A microbolometer read-out circuit, comprising:
an extraction circuit, configured to detect a voltage signal of a temperature variation;
an analog-to-digital converter, coupled to the extraction circuit and configured to digitalize the voltage signal of the temperature variation; and
an image processing circuit, coupled to the analog-to-digital converter;
wherein the image processing circuit is further coupled to a gain digital-to-analog converter and an offset digital-to-analog converter;
wherein the extraction circuit comprises:
an active pixel circuit, configured to detect an infrared radiation;
a reference pixel circuit, configured to compensate a substrate temperature;
a differential amplifier, coupled to the active pixel circuit and the reference pixel circuit; and
an amplifier, coupled to the differential amplifier.

2. The microbolometer read-out circuit of claim 1, wherein the active pixel circuit comprises:
a plurality of active pixels, wherein each of the plurality of active pixels comprises an active current source, a thermally isolation microbolometer, an active AND gate, a first active current source switch and a second active signal output switch.

3. The microbolometer read-out circuit of claim 1, wherein the reference pixel circuit comprises:
a plurality of reference pixels, wherein each of the plurality of reference pixels comprises a reference current source, a thermally short microbolometer, a reference AND gate, a first reference current source switch and a second reference signal output switch.

4. The microbolometer read-out circuit of claim 2, wherein the plurality of active pixels are thermally isolated by a plurality of elevated floats.

5. The microbolometer read-out circuit of claim 2, wherein the plurality of active pixels further comprise a resistor and a third switch, a first end of the resistor is coupled to a first end of the thermally isolation microbolometer, a second end of the resistor is coupled to a first end of the third switch, and a second end of the third switch is coupled to a second end of the thermally isolation microbolometer.

6. The microbolometer read-out circuit of claim 1, wherein the image processing circuit comprises a gain calculation unit, a compensation calculation unit and an image output unit.

7. A calibration method for a microbolometer, which detects a temperature of the microbolometer and calibrates an error of the microbolometer, wherein the method utilizes the microbolometer read-out circuit of claim 1, and the method comprises:
(A) heating a substrate of the microbolometer read-out circuit, such that the substrate reaches a first substrate temperature, and a scene temperature of the microbolometer read-out circuit is set as a first scene temperature;
(B) performing an image detection for the microbolometer read-out circuit to obtain a first image data of the microbolometer read-out circuit;

(C) cooling the substrate of the microbolometer read-out circuit to obtain a second substrate temperature and a second scene temperature;

(D) performing the image detection for the microbolometer read-out circuit to obtain a second image data of the microbolometer read-out circuit;

(E) comparing the first image data and the second image data to obtain a temperature compensation value; and (F) performing step(c) to step (E) to obtain the temperature compensation value corresponding to the cooling and transmitting the temperature compensation value to a digital-to-analog converter for transforming a voltage signal, which is utilized for adjusting the substrate temperature for compensation.

8. The calibration method of claim 7, wherein the step (E) further comprises:

comparing the first image data and the second image data by the image processing circuit.

9. The calibration method of claim 7, wherein the substrate is heated by utilizing power consumptions of a resistor and the microbolometer.

* * * * *